United States Patent
Yamamura et al.

(10) Patent No.: US 6,592,684 B1
(45) Date of Patent: Jul. 15, 2003

(54) ROLLING BEARING

(75) Inventors: Kenji Yamamura, Fujisawa (JP); Manabu Ohori, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/647,245
(22) PCT Filed: Feb. 17, 2000
(86) PCT No.: PCT/JP00/00884
§ 371 (c)(1),
(2), (4) Date: Sep. 28, 2000
(87) PCT Pub. No.: WO00/49304
PCT Pub. Date: Aug. 24, 2000

(30) Foreign Application Priority Data

Feb. 17, 1999 (JP) .............................. 11-038972

(51) Int. Cl.⁷ ............................................... C21C 38/18
(52) U.S. Cl. .................. 148/325; 148/333; 148/906; 384/912
(58) Field of Search ................. 148/906, 333, 148/325; 384/912, 492

(56) References Cited

U.S. PATENT DOCUMENTS

| | | | |
|---|---|---|---|
| 5,030,017 A | 7/1991 | Murakami et al. | 384/492 |
| 5,122,000 A | 6/1992 | Matsumoto et al. | 384/492 |
| 5,221,372 A | 6/1993 | Olson et al. | |
| 5,860,749 A | 1/1999 | Hirakawa et al. | 384/492 |
| 5,873,956 A | 2/1999 | Tanaka et al. | 148/318 |
| 5,998,042 A | 12/1999 | Tanaka et al. | 428/627 |

FOREIGN PATENT DOCUMENTS

| | | |
|---|---|---|
| GB | 2235212 | 2/1991 |
| GB | 2 235 212 | 2/1991 |
| GB | 2 243 417 | 10/1991 |
| GB | 2243417 | 10/1991 |
| GB | 2259714 | 3/1993 |
| GB | 2 294 980 | 5/1996 |
| GB | 2 306 505 | 5/1997 |
| GB | 2306506 | 5/1997 |
| GB | 2 310 466 | 8/1997 |
| JP | 2-277764 | 11/1990 |
| JP | 4-9449 | 1/1992 |
| JP | 4254572 | 9/1992 |
| JP | 4-254572 | 9/1992 |
| JP | 5-78782 | 3/1993 |
| JP | 5-78814 | 3/1993 |
| JP | 7-252595 | 10/1995 |
| JP | 7252595 | 10/1995 |
| JP | 8232962 | 9/1996 |
| JP | 8-232962 | 9/1996 |
| JP | 9-49527 | 2/1997 |
| JP | 9228009 | 9/1997 |
| JP | 9-228009 | 9/1997 |
| JP | 9-287053 | 11/1997 |
| JP | 9-287058 | 11/1997 |
| JP | 10-219402 | 8/1998 |
| JP | 11-100647 | 4/1999 |
| JP | 11-140593 | 5/1999 |

*Primary Examiner*—Deborah Yee
(74) *Attorney, Agent, or Firm*—Crowell & Moring LLP

(57) ABSTRACT

A rolling bearing having excellent corrosion resistance and having a long life for use in airplanes is provided. The constituent parts of the rolling bearing are made from an alloy steel containing Cr which is required for the improvement of a rolling contact fatigue life at a high temperature and is most effective for providing steels with corrosion resistance when 7.0% or more to 16% or less on a weight percent basis is provided. The amount of a residual austenite on the surface of the completed product is from 6% or more and, preferably, 35% or less by stabilizing the residual austenite.

3 Claims, 4 Drawing Sheets

FIG. 1

| SYMBOL | Cr | Mo | Ni | Co | V | C | N | (wt%) |
|---|---|---|---|---|---|---|---|---|
| A | 7.0 | – | – | – | – | 0.35 | – | |
| B | 9.0 | 3.0 | 1.3 | 3.0 | 0.1 | 0.07 | – | |
| C | 12.8 | 1.7 | 2.5 | 5.3 | 0.6 | 0.07 | – | |
| D | 13.1 | – | – | – | – | 0.45 | 0.15 | |
| E | 13.5 | 1.5 | 2.0 | 2.5 | 0.4 | 0.02 | 0.12 | |
| F | 15.2 | 1.2 | – | – | – | 0.30 | 0.35 | |
| G | 16.0 | – | – | – | – | 0.45 | – | |
| H | 16.0 | – | – | – | – | 0.58 | 0.10 | |
| I | 5.3 | – | – | – | – | 0.40 | – | |
| J | 4.2 | 4.1 | 0.1 | – | 1.0 | 0.82 | – | |
| K | 17.3 | 0.5 | – | – | – | 1.05 | – | |

| SYMBOL | CORROSION RESISTANCE |
|---|---|
| A | O |
| B | O |
| C | O |
| D | O |
| E | O |
| F | O |
| G | O |
| H | O |
| I | X |
| J | X |
| K | △ |

ROLLING BEARING

BACKGROUND OF THE INVENTION

The present invention relates to a rolling bearing, particularly, for use in airplanes and it relates to an improvement for the life of the bearing.

BACKGROUND ART

Since roll bearings are used in a severe way of undergoing cyclic shearing stresses at a high surface pressure, it is necessary to ensure a rolling contact fatigue life while withstanding the shearing stresses. Therefore, high carbon-chromium bearing steels (SUJ2) have been used so far for the material constituting bearing rings (inner and outer rings) and rolling elements of the rolling bearings to which quenching/tempering have been applied to make the Rockwell hardness to HRC 58 to 64 thereby ensuring the rolling contact fatigue life.

Further, rolling bearings for use in airplanes are used at a high temperature exceeding 200° C. Then, for ensuring necessary hardness of the rolling bearings also at such a working temperature, semi-high speed steel series AISI M50 that causes secondary hardening by tempering at high temperature exceeding 500° C. is used.

By the way, along with increasing speed and decreasing fuel cost in airplanes, demand for the performance of rolling bearings for use in airplanes has become severer. On the other hand, M50 used so-far-as rolling bearings for use in aircrafts leaves a problem that coarse eutectic carbides are present which leads to flaking life. Further, since air ports are often located in coastal areas in view of a problem for the site and the problem of noises, rolling bearings for use in airplanes are often used or stored in circumstance tending to cause rust by salt damages. Since fracture of the rolling bearings for use in aircrafts will lead to a fetal accident, even slight rust is often judged as limit of life. However, M50 described above also involves a problem that corrosion resistance is not enough since it contains less Cr which is most effective for the improvement of the corrosion resistance of steels.

In recent years, a carburized type M50 NiL developed with an aim of improving the toughness in the core portion of M50 has also been used but the surface characteristic is substantially identical with M50.

The present invention has been developed in order to overcome the foregoing problems and it is an object thereof to provide a rolling bearing suitable for use in airplanes which is more excellent in the rolling contact fatigue life characteristic and the corrosion resistance than AISI M50 or M50 NiL.

SUMMARY OF THE INVENTION

At present, no lubricant workable at a high temperature exceeding 250° C. has yet been put to practical use and, therefore, the working temperature of the rolling bearing for use in airplanes is also from 200 to 250° C., so that the present inventors have continued earnest studies on the improvement of the life characteristic and the rolling contact fatigue life, as well as on the improvement of the corrosion resistance of the rolling bearing in a temperature region from 200 to 250° C. and have accomplished the present invention.

It has been found that steels containing a great amount of Cr are extremely effective for improving the rolling contact fatigue life characteristic at high temperature since residual austenite formed upon quenching is stable, that is, a great amount of Cr prevent decomposition of the residual austenite. Further, Cr is a most effective element for improving the corrosion resistance and it has to be added at least by 7% by weight or more in order to obtain such effects sufficiently. It is preferably added by 9% weight or more. On the other hand, for improving the rolling contact fatigue life, it is necessary that the amount of residual austenite in the surface layer is 6 vol % or more and, preferably, 10 vol % or more. However, it is necessary to previously apply tempering at a temperature higher enough than the working temperature in order to prevent dimensional change by the martensitic transformation of the residual austenite (due to tempering). Since it is aimed at a working temperature of 200° C. or higher in the present invention, tempering has to be applied at a temperature of about 300° C. at the lowest. Further, for the addition of Cr, even when it is added in excess of 16% by weight, its effect is saturated and increase in the amount is not only useless but also deteriorates the workability and increases the material cost to increase the cost unnecessarily, so that the upper limit is defined as 16% by weight. Further, for the amount of the residual austenite, since too much amount results in the deterioration of the hardness, 35% is preferred as the upper The rolling bearing of the present invention includes an inner ring, an outer ring and rolling elements, wherein at least one of the inner ring, the outer ring and the rolling elements comprises an alloy steel containing from 7.0% or more to 16% or less of Cr on the weight % basis, and the amount of residual austenite in the surface of at least one of the raceway surface of the bearing ring or the rolling surface of the rolling element of a completion product is 6% by volume or more.

Further, a rolling bearing of the present invention has the feature wherein the amount of residual austenite is from 10% by volume or more to 35% by volume or less.

Further, the rolling bearing of a present invention has the feature in the wherein the alloy steel contains from 0.2% by weight or more to 0.6% by weight or less of C and from 9% by weight or more to 16% by weight or less of Cr.

Further, a rolling bearing of the present invention has the feature, wherein at least one of the inner ring, the outer-ring and the rolling element is tempered at a high temperature from 350° C. or higher to 500° C. or lower and used at a temperature from 200° C. or higher to a temperature lower than that for the high temperature tempering.

Further, a rolling bearing of the present invention has a feature, wherein the size of eutectic carbides present on the raceway surface or the rolling surface is 10 μm or less.

Further, a rolling bearing of the present invention has a feature, wherein C and Cr contained in the alloy steel satisfy the relation: C %≦−0.05Cr %+1.41.

The critical meanings in the present invention are as shown below.

Cr: 7.0% by weight≦Cr≦16.0% by weight

Cr is an element necessary for improving the rolling contact fatigue life at high temperature by stabilizing the residual austenite and an element most effective to provide steels with corrosion resistance. If the addition amount is less than 7% by weight, no sufficient effect to the rolling contact fatigue life characteristic and the corrosion resistance can be obtained, so that the lower limit is defined as 7% by weight. Further, it is added more preferably by 9% by weight or more in view of the corrosion resistance. However, even if it is added in excess of 16% by weight, the effect is saturated and increase in the amount not only is useless but also deteriorates the workability and increases the material cost to unnecessarily increase the cost, so that the upper limit is defined as 16% by weight.

C: 0.2% by weight≦C≦0.6% by weight

C has an effect of improving the hardness by transforming the structure martensitic after quenching and tempering thereby increasing the strength and suppressing the formation of δ ferrite deleterious to the toughness, but addition of a great amount results in precipitation of coarse eutectic carbides to deteriorate the rolling contact fatigue characteristic. Accordingly, the upper limit for the addition of C is defined as 0.6% by weight. For suppressing the formation of δ ferrite deleterious to the toughness, C has to be added so as to satisfy the following relation 1 and, as apparent from the equation, Ni, Co or N may be added in place of the addition of C. However, since the addition of an alloy element such as Ni, Co or N results in increase of the cost and deteriorates the workability of the material, it is desirable that C is added by 0.2% by weight or more to prevent formation of δ ferrite.

$$A \geq 1.14 \times B - 12.5 \quad (1)$$

$$A = Ni + Co + 30C + 25N$$

$$B = Cr + 1.5 Mo + 5V$$

That is, assuming Ni, Co as 0, (Mo, V, N=0) and assuming Cr as 16% by weight for the upper limit of Cr, as a preferred form, the lower limit for C in the present invention is defined, in view of the relation:

$$A = 30C + 25N \geq 1.14 (Cr + 1.5Mo + 5V) - 12.5, \text{ as}$$

$$C\% \geq (1.14 \times 16\% - 12.5)/30 \approx 0.19\%,$$

that the lower limit for C is 0.2% by weight and formation of δ ferrite can be suppressed.

Relation Between the Amount of C and the Amount of Cr and N in a Case When N is Contained in Addition to C in the Material In a case where the Cr content is high and the C content is low, δ ferrite is formed to remarkably lower the toughness but the C concentration at which δ ferrite forms is lowered with addition of N. Since formation of δ ferrite can be suppressed by defining the lower limit for the C concentration as: C %≧0.04Cr %−0.83N %−0.39, it is desirable to satisfy the relation of the formula.

Size of Eutectic Carbide of 10 μm or less

If the upper limit for the C concentration is not defined as C % is −0.05Cr %+1.41 or less, coarse primary eutectic carbides of 20 μm or more are formed to lower the acoustic characteristic and the fatigue life. Accordingly, rolling bearings excellent in them can be provided by restricting the size of the eutectic carbides to 10 μm or less. Even when the relation described above is satisfied, it is often observed that the primary eutectic carbides are grown to about 5–20 μm or more under the effect of a solidification rate or the like during steel making. However, in the alloy steels used for the rolling bearing of the present invention, fine secondary carbides or nitrides are precipitated thereby enabling to enhance the strength by either preventing growing of the eutectic carbides in excess of 20 μm or without causing eutectic carbides at all, so long as the relation for suppressing the growing of eutectic carbides is satisfied.

BRIEF DESCRIPTION OF THE DRAWINGS

FIG. 1 is an explanatory view for the material used in examples and comparative examples of rolling bearings according to the present invention.

DETAILED DESCRIPTION OF THE PREFERRED EMBODIMENTS

At first, FIG. 1 shows chemical ingredients for the materials A–K used in each of the tests. What are shown in the figure are main ingredients and, in addition, 0.2 to 1.0% by weight of Si and Mn required as deoxidizers upon steel making are contained, and elements such as O, N, Al, Ti and Cu are contained each in a trace amount as impurities.

From the materials with each of the ingredients, test pieces for a rolling contact fatigue life test having 60 mmφ outer diameter×5.5 mmφ inner diameter×6 mm thickness, and test pieces for a corrosion resistant test having 20 mmφ diameter×10 mm thickness were manufactured. Each of the test pieces was finished to a predetermined shape and size by grinding after heat treatment. Further, the test pieces for the rolling contact fatigue life was further applied with lap finishing at the test surface and used for the test.

As the condition of the heat treatment for each of the test pieces, materials A–C, E, G and I were applied with vacuum carburization at 920–950° C., quenched at 950–1100° C. and tempered at 350–500° C. Since C may be added in carburization for obtaining a surface hardness required as the rolling bearing, the carburization method is not restricted to vacuum carburization but other method such as plasma carburization may also be used. Similar effects can also be obtained with a carbonitrization treatment or the like. Further, the materials D, F and H, and the material K as the existent SUS440C were quenched at 1000–1100° C. and then tempered at 350–500° C. The material J is AISI M50 as the existent example, which was quenched at 1130° C. and then tempered at 550° C. for two hours by three times. The material K is SUS40C.

By the application of the heat treatment described above, the surface hardness was adjusted to HRC 59–65 for each of the materials. Further, in the materials A and G, the amount of residual austenite was changed by variously controlling the carburization time, the quenching temperature and they temperature, and the materials were prepared respectively into test specimens and used for the test.

Figure 2:
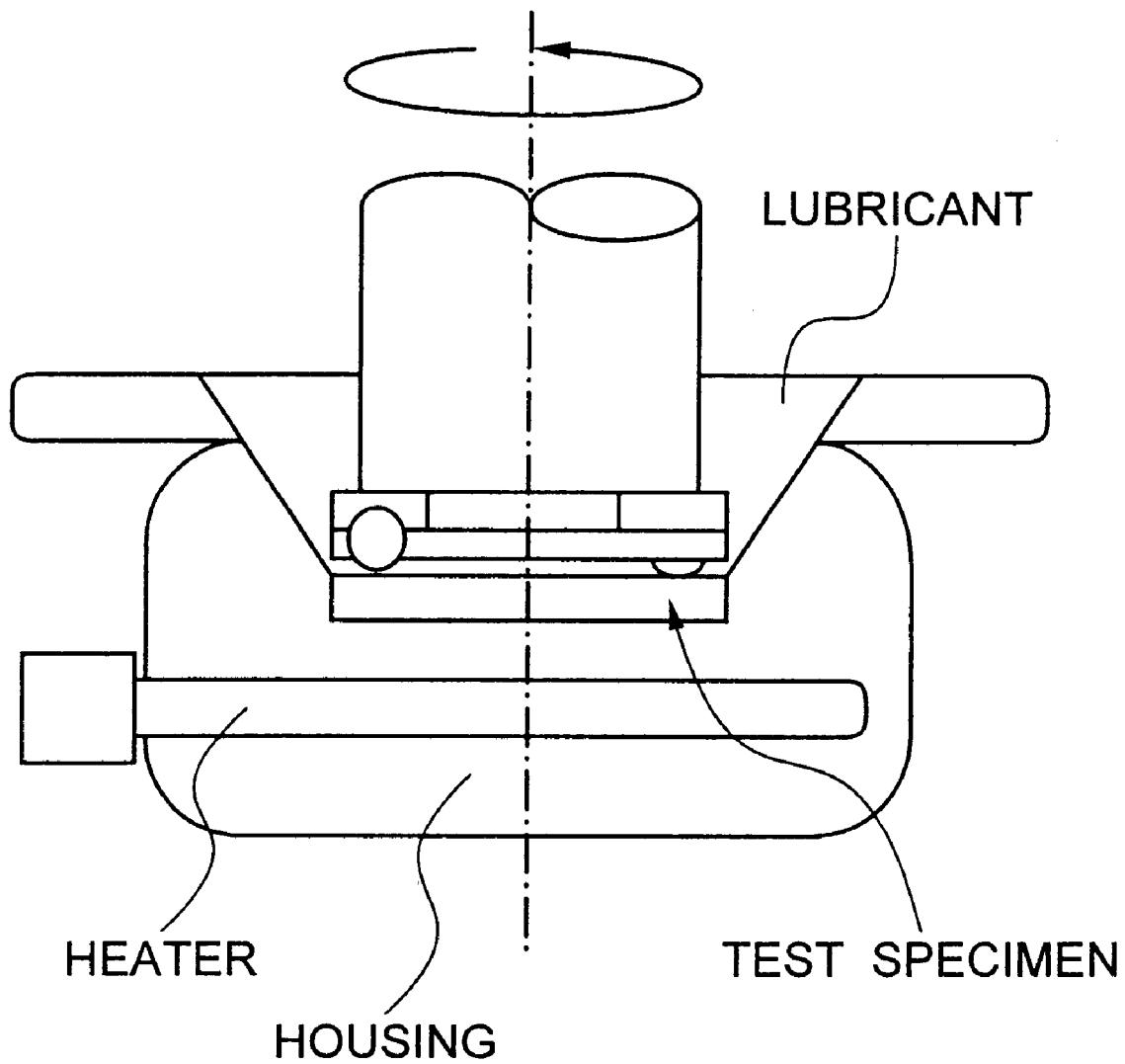
FIG. 2 is an explanatory view for a rolling contact fatigue life test conducted for examples and comparative examples of rolling bearings according to the present invention.

Then, the rolling contact fatigue life test is to be explained. For the test, a thrust type life tester of a structure shown in FIG. 2 was used and the test was conducted under the condition in which obstacles were incorporated in an oil bath. The test conditions are as shown below.

| ROLLING CONTACT FATIGUE LIFE TEST | |
| --- | --- |
| Surface pressure | Pmax = 5.5 GPa |
| Number of rotation | 1000 rpm |
| Lubrication | polyphenyl ether series oil |
| Oil temperature | 250° C. |

Figures 3, 4:
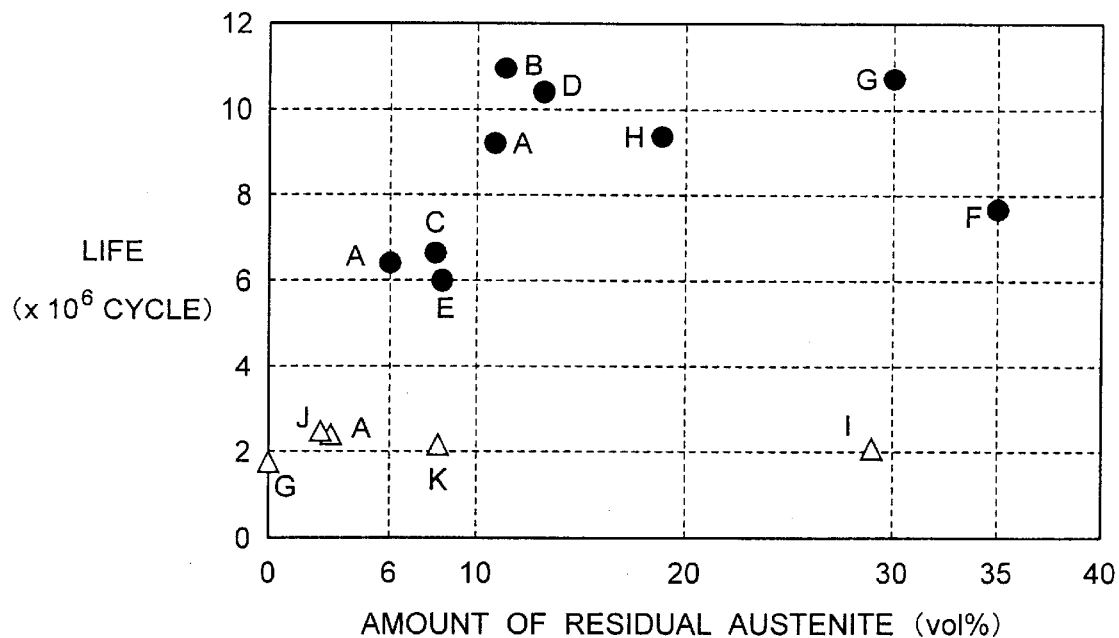
FIG. 3 is an explanatory view illustrating a relation between the amount of residual austenite in the steel and the rolling contact fatigue life.
FIG. 4 is an explanatory view for the result of a corrosion resistance test conducted for examples and comparative examples of rolling bearings according to the present invention.

The test was conducted on each 15 test specimens for each of the materials and heat treatment conditions and a Weibull plot was prepared defining the number of cyclic stresses till flaking (cycle) as the life value and $L_{10}$ life was determined for each of the cases based on the result of each Weibull distribution. FIG. 3 shows the obtained $L_{10}$ life. It can be seen from the figure that when the amount of residual austenite is 6% by volume or more and the Cr content is 7% by weight or more, a life about three times as long as the materials J and K as the existent example can be obtained and, further, if the amount of the residual austenite exceeds 10% by volume, a life about five times as long as the materials J and K as the existent example can be obtained. Further, it can be seen that the life is short when the Cr content is low although the amount of the residual austenite is great (material I). However, while the material K shows the amount of residual austenite of 8% by volume, since eutectic carbides of a size in excess of 10 μm are present, the life was equivalent with that of material J.

Then, a corrosion resistance test is to be explained. In the corrosion resistant test, the specimens described above were immersed in tap water at a normal temperature for 24 hours and then the surface was observed and indicated by "○" for those not observed for rusting and "X" for those observed for rusting in FIG. 4. For the materials A and G, namely, those corresponding to the upper and lower limit values as the constituent factor of the present invention are shown for those treated under the heat treatment conditions giving the longest life as the result of the life test described above.

As apparent from the figure, it can be seen that corrosion resistance identical with a case of high Cr content of 16% by weight can be obtained providing that the Cr content is 7% by weight or more and that sufficient corrosion resistance can be obtained as the martensitic steel. The material K could provide good results to some extent in the result of the corrosion resistance test but because of the presence of eutectic carbides with the size in excess of 10 μm, corrosion occurred from the grain boundary of the eutectic carbides (bonded layer) as the rusting circumstance became severe, so that it was evaluated as "Δ".

Figure 5:
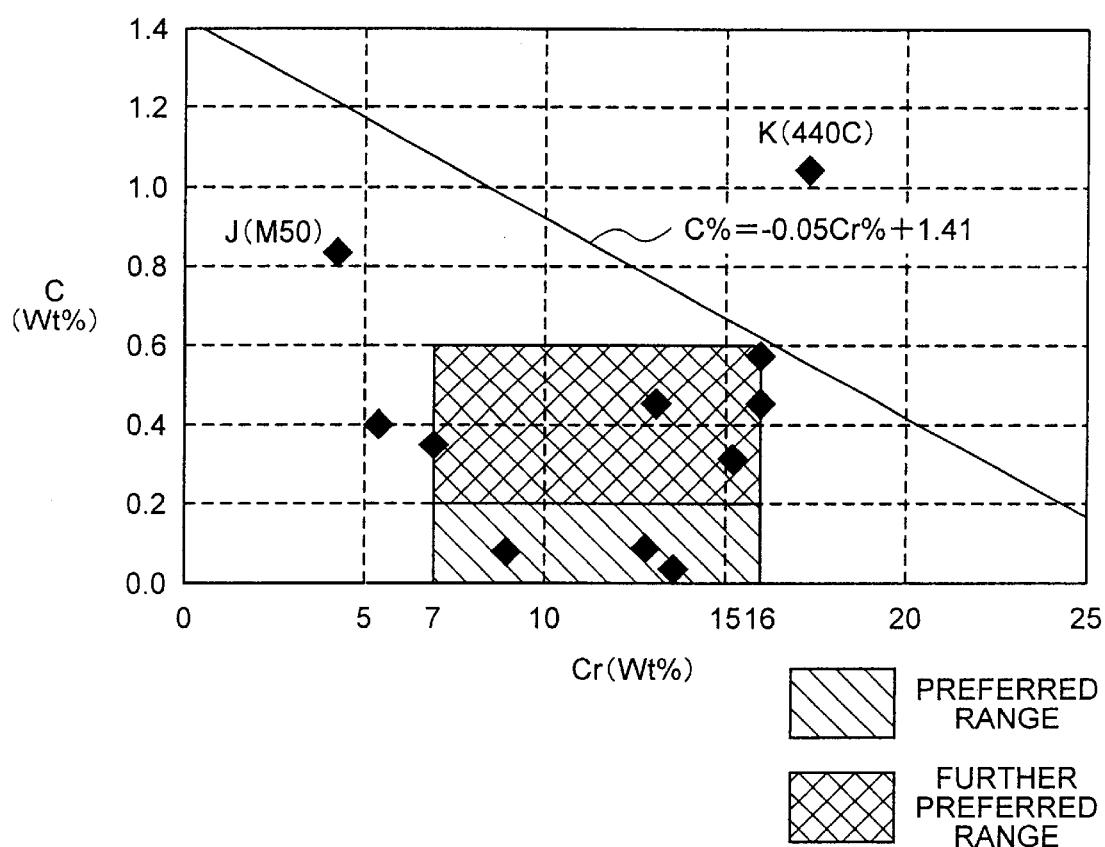
FIG. 5 is an explanatory view of examples and comparative examples of rolling bearings according to the present invention, being replaced with a relation between C and Cr.

Then, materials served for each of the tests are shown being substituted with the relation between the C concentration and the Cr concentration and plotted in FIG. 5. In view of the figure, any of the materials providing satisfactory result satisfies the relation: C % ≦ −0.05Cr % +1.41. Further, referring to Cr, it is desirably 7% by weight or more and 16& by weight or less. Referring to C, it is desirably 0% by weight or more and 0.6% by weight or less, more preferably, 0.2% by weight or more and 0.6% by weight or less.

As has been described above, according to the rolling bearing of the present invention, the corrosion resistance can be made more excellent and the life can be extended than in the prior art by providing an alloy steel containing from 7.0% or more to 16% or less of Cr on the weight basis, and controlling the amount of the residual austenite from 10% by volume or more to 35% by volume or less in the surface raceway surface of the bearing ring or the rolling surface of the rolling element of a completion product. Further, the rolling life or the acoustic characteristic can be improved further, by controlling the amount of the residual austenite from 10% by volume or more to 35% by volume or less, by using an alloy steel containing from 0.2% by volume to more or 0.6% by weight or less of C and containing from 9% by weight or more to 16% by weight or less of Cr, by defining at least one of the inner ring, outer ring and the rolling element to be tempered at a high temperature from 350° C. or higher to 500° C. or lower and to be used at a temperature from 200° C. or higher to a temperature lower than the temperature of the high temperature tempering, or restricting the size of the eutectic carbide present in the raceway surface or rolling surface to 10 μm or less, or by causing C and Cr contained in the alloy steel to satisfy the relation: C % ≦ −0.05Cr % +1.41.

What is claimed is:

1. A rolling bearing for use in airplanes comprising an inner ring, an outer ring and rolling elements wherein at least one of the inner ring, the outer ring and the rolling element is made from an alloy steel consisting essentially of from 7.0% to 16% of Cr by weight, a content of C+N and an amount of residual austenite in a temperature range from 350° C. to 500° C. in at least one of a raceway surface of a ring or a rolling surface of the rolling element of a completed product is 0.6% by weight or more and from 6% by volume to 35% by volume, respectively.

2. A rolling bearing as defined in claim 1, wherein the amount of the residual austenite is from 10% by volume to 35% by volume.

3. A rolling bearing as defined in claim 1 or 2, wherein the size of eutectic carbides present in the raceway surface or the rolling surface is 10 μm or less.

* * * * *